March 5, 1946.  R. D. WILKINS  2,395,949
VIBRATION-ABSORBING PAD
Filed April 14, 1941  3 Sheets-Sheet 1

Inventor:
Roger D. Wilkins
By Carl S. Floyd
Attorney.

March 5, 1946. R. D. WILKINS 2,395,949
VIBRATION-ABSORBING PAD
Filed April 14, 1941 3 Sheets-Sheet 2

Inventor:
Roger D. Wilkins
By [signature] Attorney.

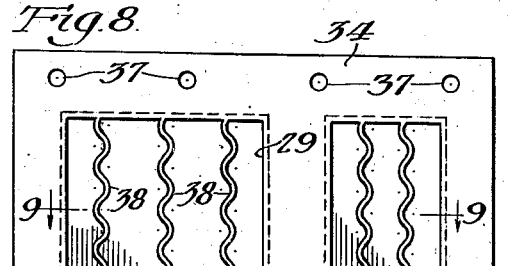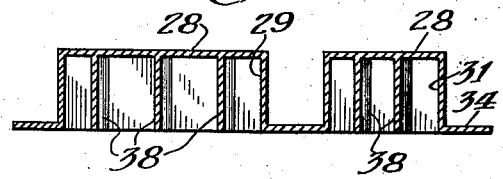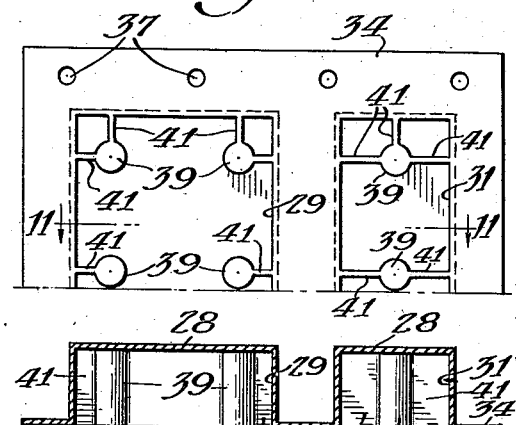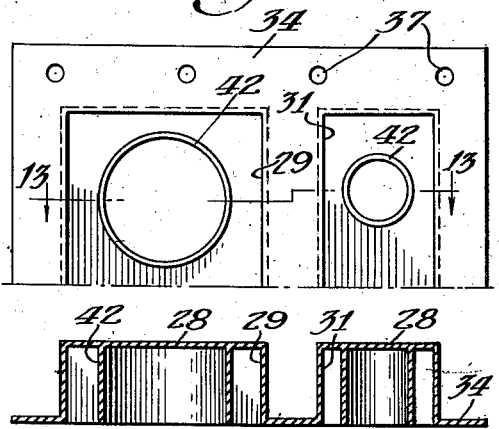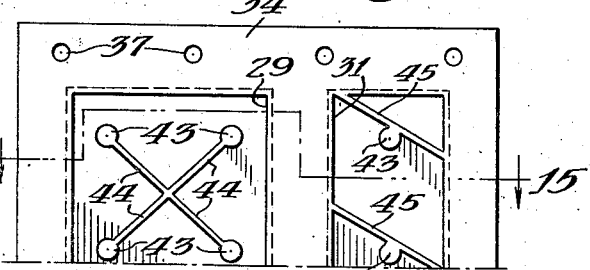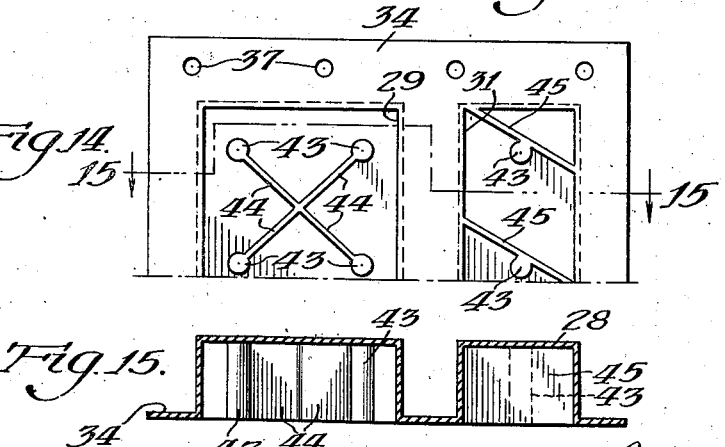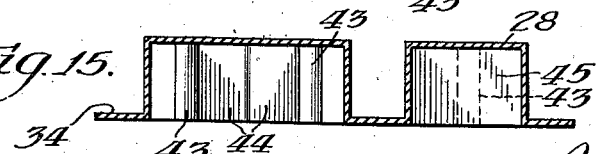

Patented Mar. 5, 1946

2,395,949

UNITED STATES PATENT OFFICE 2,395,949

VIBRATION-ABSORBING PAD

Roger D. Wilkins, Oak Park, Ill., assignor to Western Felt Works, Chicago, Ill., a corporation of Illinois Application April 14, 1941, Serial No. 388,399

3 Claims. (Cl. 267—1)

This invention relates to a pad for absorbing or eliminating vibration in mechanisms in which it is used. A particular use contemplated is in connection with airplane motors using a cowl or speed ring assembly, the pad being placed between the cowl and the rocker arm cover so as to eliminate or greatly reduce vibration of these parts.

The pads which have been used for this purpose in the past have been subject to serious objections from the standpoint of durability and effectiveness. It has been found, for example, that pads made of leather and duck with felt interposed between these two materials (a form of pad commonly used in the past) have a life of only approximately fifty flying hours. This necessitated frequent changes which were expensive, since to change the pads it is necessary to remove the cowling or speed ring from the motor and replace the pads, which are attached to the cowl by bolts or screws, and this had to be done when there was no other occasion for removing the cowling. The pad provided by the present invention has been found to have an effective life of approximately 600 hours and thus effects a great saving in airplane operation by avoiding the necessity of frequent changes. In fact, it practically eliminates the necessity for removing the cowling specially for replacing the pads, since it is necessary to overhaul the motor of an airplane at least after every 500 or 600 hours of flying time and the pads may, therefore, be replaced at the time of regular overhauling.

In addition to its durability in other respects, the pad of the present invention is adapted to resist deteriorating action of oil and solvents that are used in cleaning the motor, such as oleum spirits. Inasmuch as such cleaning is done after each flight, this is a highly important consideration and remedies another defect which has been inherent in pads of the type formerly used.

The pad of the present invention is also highly heat resistant and has the quality of resiliency, which it is adapted to retain even after long usage, thus being conformable to the space between the rocker arm cover and the cowl of the motor, notwithstanding variations in the distance between these parts resulting from expansion and contraction caused by alternate heating and cooling of the motor.

The object of the invention is to provide a pad having the foregoing and other desirable characteristics which will be better understood from the following description, taken in connection with the accompanying drawings illustrating a preferred embodiment of the invention and several modifications thereof shown by way of example.

In the drawings:

Fig. 8 is a partial bottom plan view of a further modification of the pad construction;

Fig. 9 is a cross-sectional view taken substantially on the line 9—9 of Fig. 8; and Figs. 10 and 11, Figs. 12 and 13, and Figs. 14 and 15 are views similar to those of Figs. 8 and 9, showing other modifications of the construction.

Figure 1:
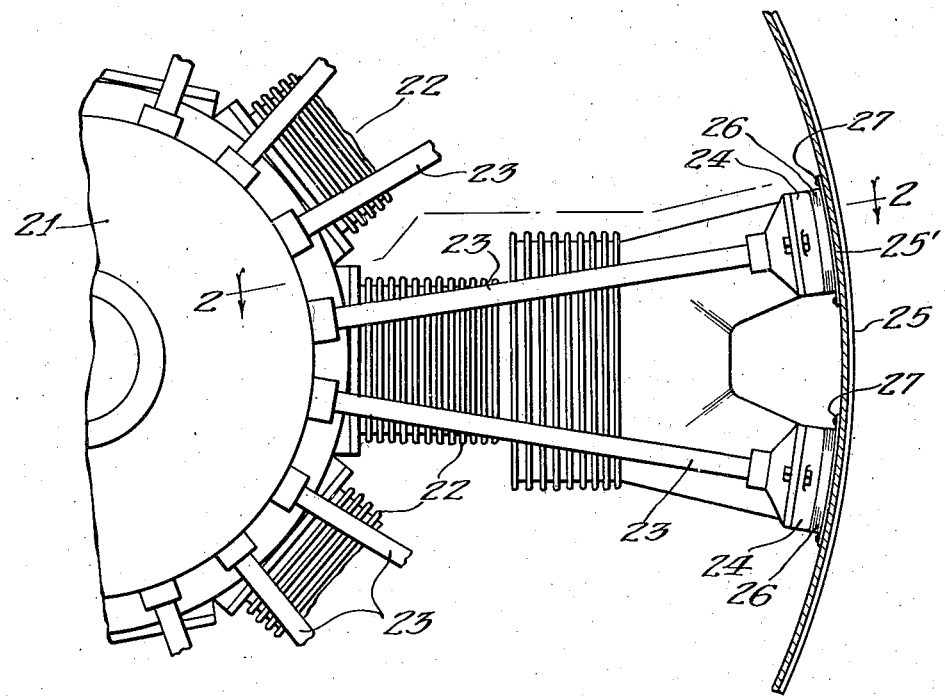
Fig. 1 is an elevational and sectional fragmentary view of an airplane motor showing the location of the pad of the invention when applied to the use hereinabove particularly mentioned.
Figure 2:
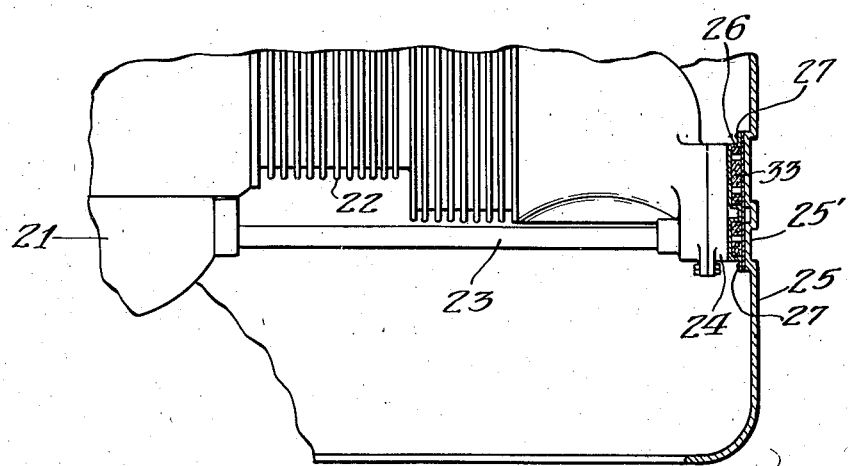
Fig. 2 is a plan section taken substantially on the line 2—2 of Fig. 1.

In Figs. 1 and 2 I have shown fragmentarily a whirlwind type airplane motor, the main body of the motor being designated by the reference numeral 21 and the radially disposed cylinders by the numeral 22. The rocker arms 23 of the motor extend radially from the main body 21 and the ends thereof are provided with covers 24 which are positioned adjacent the speed ring or cowling 25, and it is between said rocker arm covers 24 and said cowling 25 that the pads of the present invention are located. Said pads are indicated generally by the reference numeral 26 and are attached to a ring 25' in the cowling 25 by means of bolts or screws 27 extending through marginal flanges of the pads and through said cowl ring 25', being thereby removably secured in the desired location to absorb the vibration of the rocker arms. It will be understood that in view of the very high speed at which modern airplane motors operate, vibration-absorbing pads are essential to prevent undue vibration or dislodgement of the cowling which is held in place merely by contact with such pads on the rocker arm covers, and to prevent excessive noise.

Figure 5:
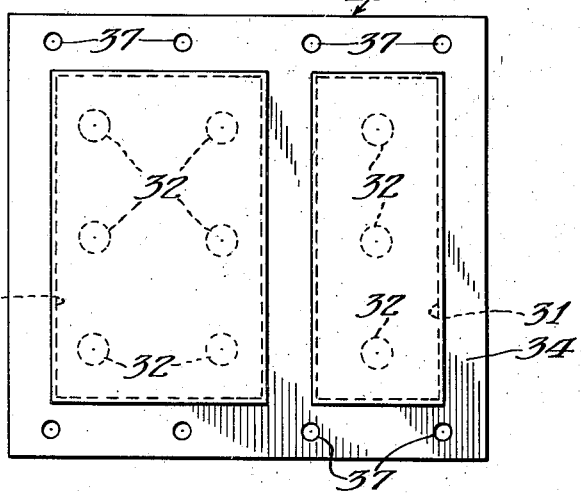
Fig. 5 is a bottom plan view of a modified form of the pad in which the compressible elements are contained in two separate pockets or compartments in the casing of the pad.
Figure 6:
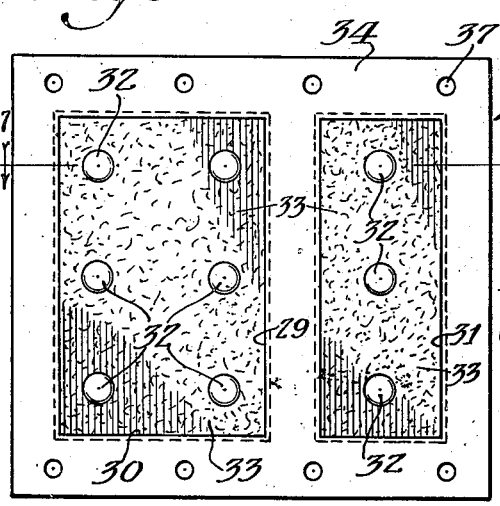
Fig. 6 is a plan view taken on the line 6—6 of Fig. 7, showing the felt pillows, which are used in the pad of the present invention, inserted in the pockets or compartments of the casing.
Figure 7:
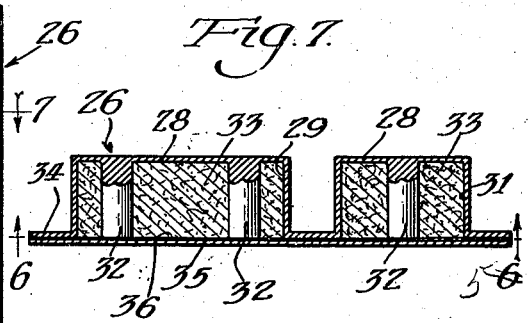
Fig. 7 is a cross-sectional view taken substantially on the section line 7—7 of Fig. 6.

Figs. 5 to 7, inclusive, show a preferred form of the pad of my invention and attention is therefore directed first to these figures. The pad as illustrated therein comprises an outer coating or cover 28, which may be made of a synthetic rubber compound or rubber-like material such as butadiene synthetic rubber, chloroprene or ethylene polysulphide. Said coating may also be made of a flexible resin such as polyvinyl alcohol or one of the alkyd type resins properly polymerized, or any other polymerizible resin which possesses good flexibility. Any of the materials used should have good heat resistance and resistance to mineral oils and to oleum spirits, the latter being commonly used in cleaning airplane motors. Instead of using a coating or cover made entirely of such materials, however, a fabric base coated with any of the compounds mentioned, or equivalent compounds, could be employed.

Said coating or cover 28, as shown in Figs. 5 to 7, inclusive, is molded to form two rectangular pockets or compartments indicated by the numerals 29 and 31, respectively, and a number of spaced compression posts or pillars 32 are formed integrally with said coating or cover 28, and are disposed in said pockets or compartments in any desired number and arrangement.

These posts or pillars 32 are made of synthetic rubber-like material, such as Neoprene and buna rubber, which materials possess good oil and solvent resistant qualities and have a low "compression set," i. e. low residual decrease in thickness, after removal of a load to which the rubber-like material has been subjected for a definite time and under definite temperature conditions.

The pockets or compartments 29 and 31 are filled with felt pads or pillows 33 which are punched to provide apertures for the posts 32, the felt fitting closely upon said posts and being of thickness corresponding to the length of the posts.

The cover member 28 is provided with a marginal flange 34 and a piece of fabric 35, coated with chloroprene polymers or chloroprene elastometer or other suitable oil and solvent resistant material, is applied over the bottom of the pad, the edges thereof underlying the marginal flange 34 of said cover 28.

A suitable vulcanizable cement which will withstand the deteriorating action of mineral oil and oleum spirits or other adhesive 36 is used to secure the fabric sheet 35 to the flange 34 and to the felt pads 33, thus forming a complete enclosure for said pads and providing a unitary construction to facilitate the handling and application of the pads.

Apertures 37 are provided in the flange 34 and base sheet 35 to receive the bolts or screws 27 whereby the pads are attached to the cowl ring 25'.

Figure 3:
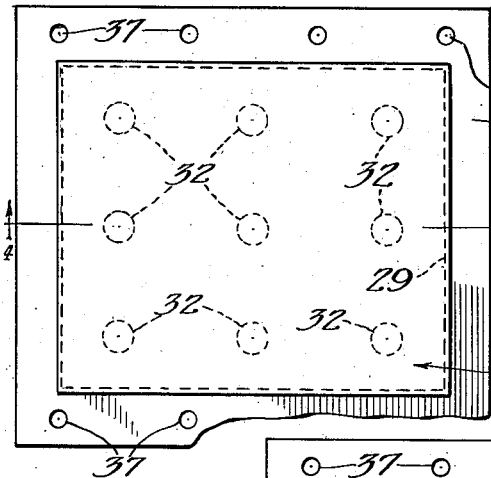
Fig. 3 is a bottom plan view of a pad in which my invention is embodied, with the base sheet removed.
Figure 4:
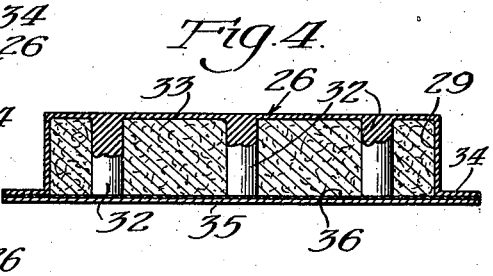
Fig. 4 is a cross-sectional view of this form of the pad taken substantially on the line 4—4 of Fig. 3.

The double compartment arrangement of the pad shown in said Figs. 5 to 7, inclusive, conforms to the usual type of ring 25', but if desired the pad could be made with only a single compartment or with any desired number of compartments. Figs. 3 and 4 show an arrangement in which only one compartment is employed, the construction being otherwise the same as that shown in Figs. 5 to 7, inclusive.

The form of the supporting members positioned in the felt-receiving compartments or cavities of the pad may also be varied to a considerable extent and in Figs. 8 to 15 I have shown by way of example form variations in the construction of these members.

In Figs. 8 and 9 I have shown, instead of the posts or pillars 32 shown in Figs. 5–7, a plurality of partitions or walls 38 extending across the compartments and anchored to the side and top walls thereof, preferably by vulcanization or other means providing a firm bond. As shown in these figures, the walls are corrugated but they could be straight if desired, or of other form. The felt is, of course, cut to conform to form and arrangement of the walls.

In Figs. 10 and 11 the supporting members comprise posts or pillars 39 and wall sections 41 extending from said posts 39 to the outer walls of the compartments. The spaces in the compartments not occupied by these posts and wall sections are, of course, filled by the felt pillows.

In Figs. 12 and 13 the supporting members are shown in the form of relatively large circular walls 42 around and within which the felt is located.

In Figs. 14 and 15 the supporting members comprise posts 43, which, in the large compartment 29, are connected by intersecting wall members 44, and, in the small compartment 31 are connected to the outer walls of the compartment by diagonally disposed wall members 45.

Other possible variations will be apparent from the foregoing examples.

In any of the forms of the invention, the supporting members serve to prevent the felt from becoming permanently flattened and tend to restore it to the original condition after pressure thereon is relieved.

What I regard as new and desire to secure by Letters Patent is:

1. A vibration-absorbing pad, comprising an outer cover made of a synthetic rubber-like compound and having a plurality of firmly attached supporting members made of synthetic rubber-like material on the interior thereof, a pillow of felt within said cover with said supporting members extending therethrough in close contact therewith, said pillow and supporting members being adapted to be contracted when pressure is applied to the pad and to restore themselves to original condition when the pressure is relieved, and a base member of fabric secured to said cover and forming therewith an enclosure for said felt pillow and supporting members, said cover and suporting members being of a material which is highly resistant to deteriorating action of heat and solvents and said base member being treated with a material which is highly resistant to oil and solvents.

2. A vibration-absorbing pad, comprising an outer cover made of butadiene rubber and having a plurality of firmly attached supporting members made of synthetic rubber-like material on the interior thereof, a pillow of felt within said cover with said supporting members extending therethrough in close contact therewith, said pillow and supporting members being adapted to be compressed when pressure is applied to the said pad and to restore themselves to original condition when the pressure is relieved, and a base member made of fabric coated with an oil and heat resisting synthetic elastomer, said base member being secured to said cover and forming therewith an enclosure for said felt pillow and supporting members, said cover, supporting members and base member all being highly resistant to deteriorating action of heat and solvents.

3. A vibration-absorbing pad, comprising an outer cover made of a rubber-like compound and having a plurality of firmly attached supporting members made of rubber-like material on the interior thereof, a pillow of material such as felt within said cover with said supporting members extending therethrough in close contact therewith, said pillow and supporting members being adapted to be contracted when pressure is applied to the pad and to restore themselves to original condition when the pressure is relieved, and a base member of fabric secured to said cover and forming therewith an enclosure for said pillow and supporting members, said cover and supporting members being of a material which is highly resistant to deteriorating action of heat and solvents and said base member being treated with a material which is highly resistant to oil and solvent.

ROGER D. WILKINS.